United States Patent
Ehrlich

Patent Number: 5,221,103
Date of Patent: Jun. 22, 1993

[54] QUICK CHANGE SLIDER PANEL AND INSTALLATION METHOD FOR FLATBED TRAILER

[75] Inventor: Rodney P. Ehrlich, Monticello, Ind.

[73] Assignee: Wabash National Corporation, Lafayette, Ind.

[21] Appl. No.: 790,231

[22] Filed: Nov. 8, 1991

[51] Int. Cl.$^5$ .............................................. B62D 53/00
[52] U.S. Cl. ................................ 280/405.1; 280/149.2
[58] Field of Search ............... 280/405.1, 407.1, 149.2, 280/423.1

[56] References Cited

U.S. PATENT DOCUMENTS

| | | | |
|---|---|---|---|
| 2,962,295 | 11/1960 | Tenenbaum | 280/149.2 |
| 4,526,395 | 7/1985 | Arguin | 280/408 |
| 4,531,753 | 7/1985 | Hicks | 280/149.2 |
| 4,865,341 | 9/1989 | Hicks | 280/149.2 |
| 5,040,826 | 8/1991 | Lovell | 280/149.2 |

OTHER PUBLICATIONS

Hutchens Industries, H-8500 Slider Series.

Primary Examiner—Margaret A. Focarino
Assistant Examiner—Kevin Hurley
Attorney, Agent, or Firm—Trexler, Bushnell, Giangiorgi & Blackstone, Ltd.

[57] ABSTRACT

An anti-friction slider pad assembly for reducing the frictional resistance during sliding, longitudinal adjustment of a load support bed relative to an underlying frame structure in order to provide for adjustment of a longitudinal load distribution of the loaded bed on the frame structure, includes a seating or shoe structure for removably supporting the slider pad on the underlying frame structure in order to enable removal of the seat structure and pad therefrom as a unit for convenient replacement of the worn pad. The seat and pad preferably include respective coupling elements for securing the pad on the seat without separate fasteners. In a method for installing the anti-frictional pad, the pad is secured to the seat structure and thereafter the flanges of the seat structure guide a sidewise, lateral displacement of the pad and seat between the load bed and a suspension hanger on the underlying frame structure.

22 Claims, 2 Drawing Sheets

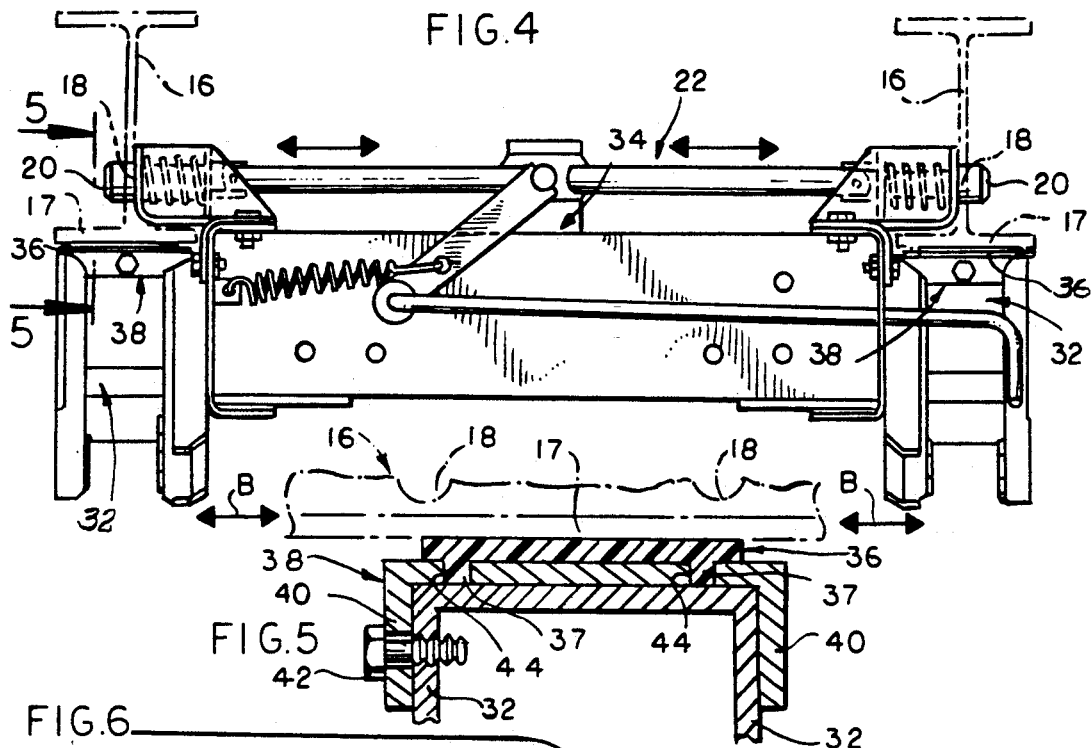
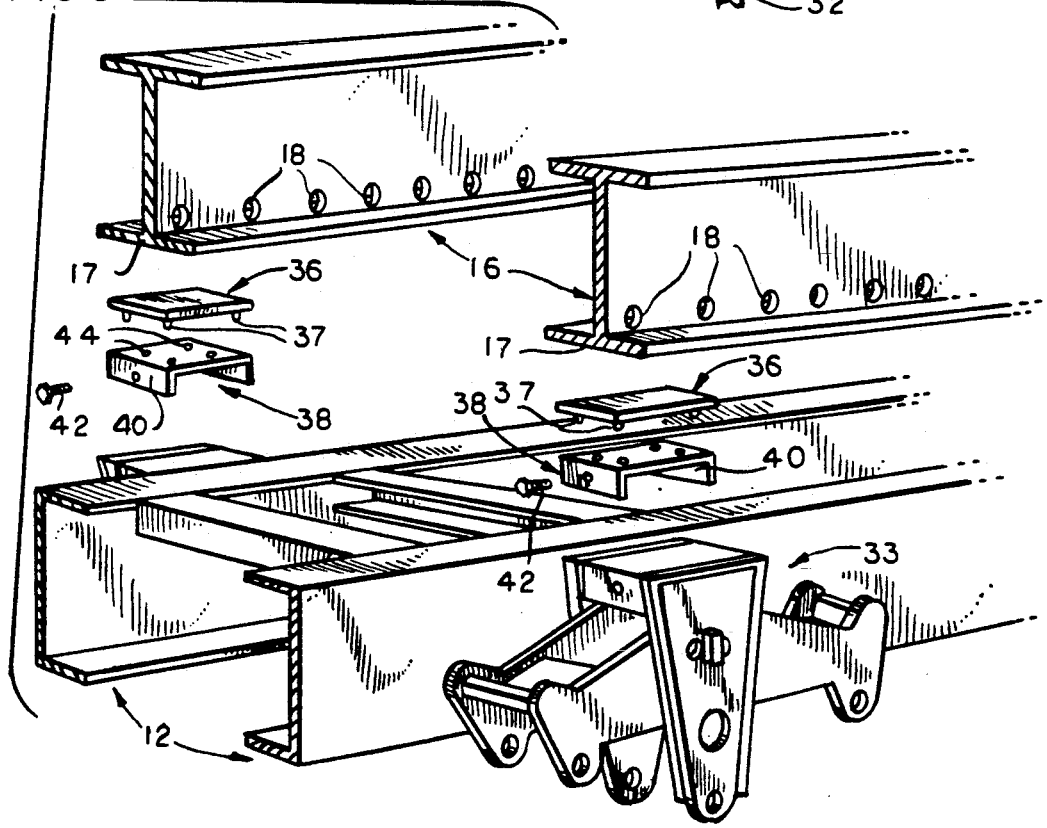

QUICK CHANGE SLIDER PANEL AND INSTALLATION METHOD FOR FLATBED TRAILER

BACKGROUND OF THE INVENTION

This invention relates to truck trailers for freight load transport, and more particularly relates to slider panels for flatbed, semi-trailer structures.

In order to enable adjustment and balancing of longitudinal weight distribution of a freight load on a modern flatbed semi-trailer, the subframe structure and coupled wheel trucks are longitudinally adjustable along the load support bed which is carried on the subframe. The longitudinal adjustment is accomplished by pulling the load support bed with the coupled tractor while holding the truck wheels and coupled trailer subframe stationary to achieve sliding displacement of the bed relative to the subframe, and relocking the bed to the subframe after the relative displacement has been achieved for the appropriate longitudinal load weight distribution of the intended freight arrangement. The sliding displacement is facilitated by providing friction reducing slider pads which are mounted on the subframe for the direct engagement of the load bed thereon. The slider pads are periodically replaced after their useful life of progressive frictional wear. Replacement of the conventional slider pads has required a procedure in which the load bed must be elevated in order to remove the underlying slider pad which is fastened to the subframe by vertically extending screws with screw heads recessed into slider pad, requiring vertical tool access to the screw heads. Accordingly, the replacement slider pads require the same vertical overhead tool access and visual alignment of the screw holes. These disadvantages are eliminated by slider pad structure and installation in accordance with the present invention.

SUMMARY OF THE INVENTION

In accordance with the present invention, an anti-friction slider pad assembly for reducing the frictional resistance during sliding, longitudinal adjustment of a load support bed relative to an underlying frame structure in order to provide for adjustment of a longitudinal load distribution of the loaded bed on the frame structure, includes a seating or shoe structure for removably supporting the slider pad on the underlying frame structure in order to enable removal of the seat structure and pad therefrom as a unit for convenient replacement of the worn pad. The seat and pad preferably include respective coupling elements for securing the pad on the seat without separate fasteners. The coupling elements can include a plurality of integrally molded studs projecting from the underside of the pad which are frictionally retained within respective receiving mortises formed in the seat structure to secure the assembly as a unit.

In a preferred embodiment, the pad and seat can be mounted on a hanger structure for suspending the shock absorbing suspension assembly carried by the subframe structure of a flatbed trailer. In such embodiment, the seat structure can include downwardly extending flanges which straddle the hanger structure.

In a preferred method for installing the anti-frictional pad, the pad is secured to the seat structure and thereafter the flanges of the seat structure guide a sidewise, lateral displacement of the pad and seat between the load bed and the hanger on the underlying frame structure. Such installation and seating for the anti-frictional pad eliminate the need for vertical tool clearance to secure the pad to the underlying frame, while achieving the pad engagement with the overlying load bed. The preferred side flanges of the seat structure, which also preferably straddle the hanger, additionally enable convenient horizontal installation of fasteners to secure the seat and pad to the underlying frame structure.

BRIEF DESCRIPTION OF THE DRAWINGS

FIG. 4 is a transverse view of the coupling assembly which enables the longitudinal adjustment and relative displacement shown in FIGS. 1 and 2;

FIG. 5 is a fragmentary, sectional view of the installed slider pad viewed substantially along a plane indicated by line 5—5 in FIG. 4; and FIG. 6 is a fragmentary and partially sectional, exploded view illustrating the slider pad assembly between the I-beams of the load bed and the subframe particularly shown in FIGS. 4 and 5.

DETAILED DESCRIPTION OF THE ILLUSTRATED EMBODIMENT

Figure 1:
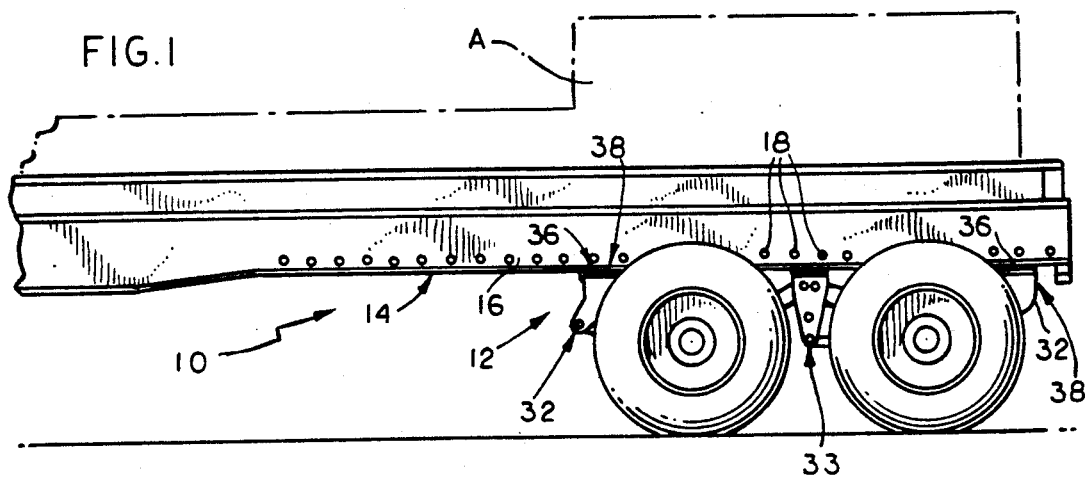
FIG. 1 is a partially fragmentary, side view of a flatbed trailer which employs slider pads in accordance with the present invention.
Figure 2:
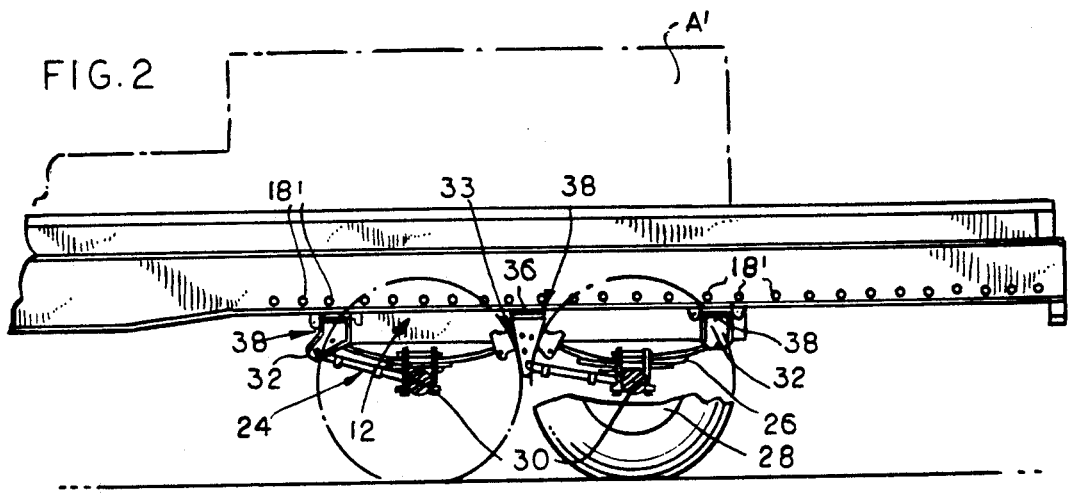
FIG. 2 is a side view similar to FIG. 1 illustrating longitudinal displacement of the subframe and wheel trucks relative to the load bed.
Figure 3:
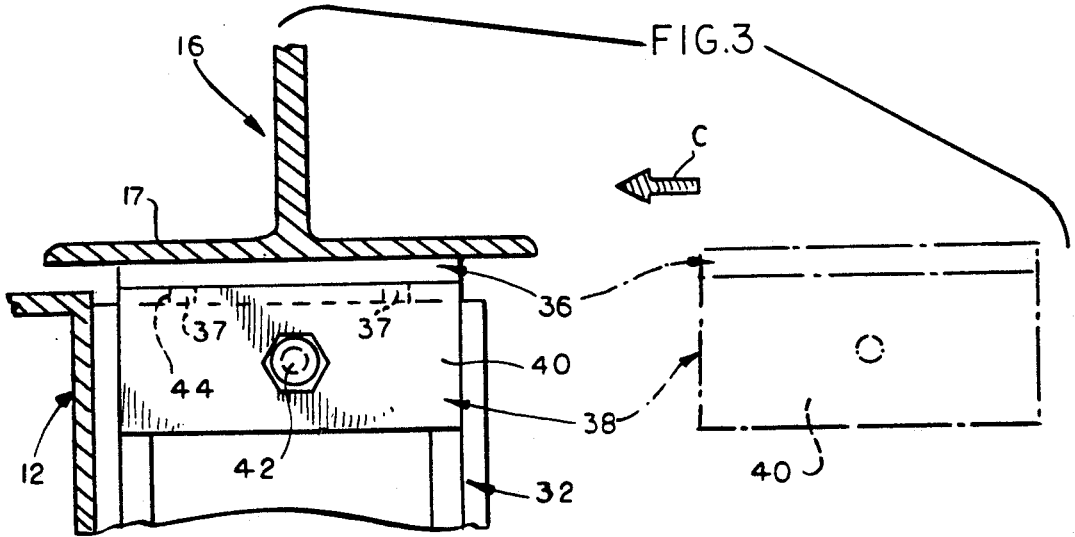
FIG. 3 is a fragmentary and partially sectional end view illustrating installation of one embodiment of the slider pad between the load bed and subframe of the flatbed trailer of FIGS. 1 and 2.

Referring to FIG. 1, a flatbed trailer assembly 10 includes a coupled subframe, truck unit 12 on which a load bed generally designated by reference character 14 is adjustably supported. The load bed 14 includes a conventional pair of spaced I-beams 16 (only one of which is shown in FIGS. 1–3). Each I-beam 16 is conventionally provided with a longitudinally arranged sequence of spaced adjustment holes 18 which receive removable coupling pins 20 of a conventional spring-operated coupling assembly generally designated by reference character 22 shown in FIG. 4. Typically, as best shown in FIG. 2, the subframe 12 includes a conventional suspension assembly generally designated by reference character 24 comprising leaf springs 26 which cushion road shocks to the wheels 28 and axles 30. The springs 26 are suspended from conventional hangers 32, 33.

As best shown in FIG. 4, the aforementioned coupling units 22 transversely bridge the oppositely aligned hangers 32 arranged on the opposing lateral sides of the subframe 12 underlying the respective I-beams 16. The coupling units 22 are conventionally operated by a manipulated lever system 34 which simultaneously retracts the ends of the two oppositely displaceable, spring-biased coupling pins 20 to withdraw them from the adjustment holes 18. The coupling pins 20 are held in the retracted position during the sliding relative displacement of the load bed 14 relative to the sub frame 12, after which the coupling pins 20 are released to extend through the appropriately spaced adjustment holes 18' corresponding to the suitable relative displacement of the load bed, as reflected in FIGS. 1 and 2, to accommodate the intended longitudinal load arrangement A'.

Referring to FIG. 5, the described longitudinal sliding displacement (arrows B) is facilitated by providing friction-reducing slider pads 36 mounted on each of the hangers 32, 33 for the direct frictional engagement of the respective bottom webs 17 of the load bed I-beams 16. The composition of the slider pads can be, for example, high density polyethylene or similarly suitable compositions of low frictional resistance. Each slider pad 36 is secured to a carrying shoe 38 which has a pair of spaced, downwardly extending mounting flanges 40 which straddle the hanger 32, 33 on which the shoe is mounted as best shown in FIG. 5. Preferably, the shoe 38 is removably secured to the hanger 32 by horizontally aligned, a self-tapping screw or bolt 42 joining a flange 40 to the hanger 32 so that the bolt 42 is readily accessible to horizontally applied drive tooling (not shown). The bolt 42 is a shoulder bolt and is constructed so there is a substantial clearance between the bolt head and shoulder and the flange 40 so that no load is transferred from the flange to the bolt. Each slider pad 36 can be joined to the respective shoe 38 prior to installation or replacement. Preferably pad 36 has a plurality of coupling studs 37 integrally molded with and projecting from the underside of pad; the studs 37 are frictionally received and retained within corresponding coupling mortises 44 formed in the upper surface of the shoe 38 as shown in FIGS. 5 and 6. The integral pad studs 37 and shoe mortises 44 enable securement of the pad to the shoe without separate fasteners and also eliminates the need for vertical tool access previously required to drive fasteners through a slider pad into a hanger in the prior art structures.

An additional benefit in preassembling the pad 36 on the shoe 38 is the resulting convenience in mounting the shoe and pad unit in a sidewise or lateral motion onto the seating hanger 32 (or 33) as indicated by arrow C in FIG. 3. As a result, the sidewise installation of the pad 36 and shoe 38 as a preassembled unit requires at most a very small elevation of the I-beam 16 and load bed 14, but in addition, the straddling of the shoe flanges 40 on the hanger 32 provides self-alignment and guidance of the lateral mounting motion C.

While particular embodiments of the assembly and method of the present invention have been described herein, it will be obvious to those skilled in the art that changes and modifications in various aspects may be made without departing from the broad scope of the invention. Consequently, the scope of the invention is not limited by any particular embodiment, but is defined by the appended claims and the equivalents thereof.

The invention is claimed as follows:

1. A slider pad assembly for use on a flatbed trailer support comprising:
    a) Anti-friction slider pad means for reducing frictional resistance during sliding, longitudinal adjustment of a load support bed relative to an underlying frame structure in order to provide for adjustment of the longitudinal weight distribution of the loaded bed on said frame structure; and
    b) Seat means removably supporting said pad means, said seat means being removably mounted on said frame structure for removal of said seat and pad means therefrom as a unit for convenient replacement of said pad means.

2. A pad assembly according to claim 1 wherein said pad means and seat means comprise respective coupling means for securing said pad means on said seat means without separate fasteners.

3. A pad assembly according to claim 2 wherein said coupling means comprises at least one coupling element projecting from said pad means and receivable within said seat means for said securement.

4. A pad assembly according to claim 2 wherein said coupling means comprises at least one coupling element integrally formed with and projecting from said pad and frictionally retained within a respective receiving mortise formed in said seat means for said securement.

5. A pad assembly according to claim 4 wherein said coupling member is integrally molded with said pad means.

6. A pad assembly according to claim 1 wherein said seat means comprises guide means for guiding laterally directed movement of said pad and seat means relative to said longitudinal adjustment direction, during installation of said pad and seat means on said frame structure.

7. A pad assembly according to claim 6 wherein said guide means comprises at least one guide flange for slidable engagement with a portion of said frame structure during said installation of the pad and seat means.

8. A pad assembly according to claim 7 wherein said seat means comprises a pair of said flange members spaced for straddling therebetween a hanger structure supporting a shock absorbing system carried on said frame structure.

9. A pad assembly according to claim 8 wherein at least one of said flange members is removably joined to said hanger structure for securement of said seat means thereon.

10. A pad assembly according to claim 8 wherein said seat means is supported on an upper surface formed on said hanger structure.

11. A pad assembly according to claim 1 wherein said pad means comprises an uninterrupted, upper, anti-frictional surface for engagement with said load support bed.

12. A pad assembly according to claim 1 wherein said pad means includes a composition comprising high density polyethylene.

13. A pad assembly according to claim 9 wherein said flange member and said hanger structure are joined by a fastener which prevents load transfer from said flange member to said fastener.

14. A pad assembly according to claim 13 wherein clearance is provided between said fastener and said joined flange.

15. A flatbed trailer support assembly comprising:
    a) A frame structure for supporting a load-support bed;
    b) Anti-friction slider pad means for reducing frictional resistance during sliding, longitudinal adjustment of said load support bed relative to said frame structure in order to provide for adjustment of the longitudinal weight distribution of the loaded bed on said frame structure; and
    c) Seat means removably supporting said pad means, said seat means being removably mounted on said frame structure for installation or removal of said seat and pad means therefrom as a unit for convenient replacement of said pad means.

16. A trailer support assembly according to claim 15 wherein said pad means and seat means comprise respective coupling means for securing said pad means on said seat means without separate fasteners.

17. A trailer support assembly according to claim 16 wherein said coupling means comprises at least one coupling element projecting from said pad means and receivable within said seat means for said securement.

18. A trailer support assembly according to claim 16 wherein said coupling means comprises at least one coupling element integrally formed with and projecting from said pad and frictionally contained within a respective receiving cavity formed in said seat means for said securement.

19. A trailer support assembly according to claim 18 wherein said coupling member is integrally molded with said pad means.

20. A trailer support assembly according to claim 15 wherein said seat means comprises guide means for guiding laterally directed movement of said pad and seat means relative to said longitudinal adjustment direction, during installation of said pad and seat means on said frame structure.

21. A method for installing an anti-frictional pad member on a flatbed trailer frame structure in order to subsequently reduce frictional resistance during longitudinal sliding adjustment along the longitudinal dimension of a load support bed carried on said frame structure enabling adjustment of the longitudinal weight distribution of the loaded bed on the frame structure, comprising: mounting and securing said anti-frictional pad member upon a supporting shoe structure; and thereafter installing the secured pad and shoe structure on said frame structure.

22. A method according to claim 21 wherein said installation step comprises displacing said secured pad and shoe onto said support frame in a direction laterally transverse to said longitudinal dimension.

* * * * *